US008919521B2

(12) United States Patent
Miyashiro (10) Patent No.: US 8,919,521 B2
(45) Date of Patent: Dec. 30, 2014

(54) APPARATUS FOR COUNTING DEPOSIT BEVERAGE CONTAINERS

(71) Applicant: Thomas H. Miyashiro, Honolulu, HI (US)

(72) Inventor: Thomas H. Miyashiro, Honolulu, HI (US)

(*) Notice: Subject to any disclaimer, the term of this patent is extended or adjusted under 35 U.S.C. 154(b) by 0 days.

(21) Appl. No.: 13/767,552

(22) Filed: Feb. 14, 2013

(65) Prior Publication Data

US 2013/0206541 A1 Aug. 15, 2013

Related U.S. Application Data

(60) Provisional application No. 61/598,724, filed on Feb. 14, 2012.

(51) Int. Cl.
| | |
|---|---|
| *B65G 11/08* | (2006.01) |
| *G06M 7/00* | (2006.01) |
| *B65G 11/20* | (2006.01) |
| *G06M 7/02* | (2006.01) |
| *G07F 7/06* | (2006.01) |
| *G06M 7/04* | (2006.01) |

(52) U.S. Cl.
CPC ............... *B65G 11/203* (2013.01); *G06M 7/02* (2013.01); *G07F 7/0609* (2013.01); *G06M 7/04* (2013.01)
USPC ...... 193/2 D; 198/565; 193/25 A; 193/25 FT; 193/29; 193/32; 193/2 E (58) Field of Classification Search
USPC .......... 193/23, 25 A, 35 FT, 29, 32, 2 D, 2 E; 198/565
See application file for complete search history.

(56) References Cited

U.S. PATENT DOCUMENTS

| | | | | |
|---|---|---|---|---|
| 2,586,586 | A | * | 2/1952 | Washburn et al. ............. 198/406 |
| 2,632,588 | A | * | 3/1953 | Hoar, Jr. ......................... 53/501 |
| 3,635,324 | A | * | 1/1972 | Burgess, Jr. .................... 198/383 |
| 3,887,053 | A | * | 6/1975 | Luiten ............................. 193/34 |
| 3,891,080 | A | * | 6/1975 | Neises ........................... 198/531 |
| 4,264,213 | A | * | 4/1981 | Dillman ........................... 366/9 |
| 4,304,611 | A | * | 12/1981 | Ellis ................................ 134/23 |
| 4,395,625 | A | | 7/1983 | Schutt |
| 4,469,215 | A | * | 9/1984 | Buer et al. ..................... 198/382 |
| 4,677,283 | A | * | 6/1987 | Lewis ........................... 235/98 C |
| 4,987,988 | A | * | 1/1991 | Messina et al. ............... 193/2 R |
| 5,090,031 | A | | 2/1992 | Pyne et al. |

(Continued)

FOREIGN PATENT DOCUMENTS

EP 0007248 A2 1/1980

OTHER PUBLICATIONS

PCT/US2013/026188, International Search Report and Written Opinion, Jun. 13, 2013.

*Primary Examiner* — Douglas Hess
(74) *Attorney, Agent, or Firm* — Kunzler Law Group (57) ABSTRACT

An apparatus for counting deposit beverage containers that includes a loading basin for holding a plurality of deposit beverage containers, a feed chute for receiving the containers from the loading basin having an inlet end narrowing into at least one outlet end, and at least one feed channel extending from each outlet end. The feed channel includes a choke opening that orders the containers into a single file row, an upward bend following the choke opening that decreases the downward slope of the feed channel to moderate the flow of the containers, and a downward curve following the upward bend that accelerates each container to create separation between containers.

18 Claims, 11 Drawing Sheets

(56) References Cited

U.S. PATENT DOCUMENTS

| | | | |
|---|---|---|---|
| 5,429,312 A * | 7/1995 | Ohno et al. | 241/34 |
| 5,489,019 A * | 2/1996 | DiNanno et al. | 198/752.1 |
| 6,024,208 A * | 2/2000 | Chooi et al. | 198/534 |
| 6,199,702 B1 | 3/2001 | Buer | |
| 6,279,715 B1 * | 8/2001 | Herren | 193/33 |
| 7,232,023 B2 * | 6/2007 | Ellis et al. | 193/2 R |
| 7,648,664 B2 * | 1/2010 | Teal et al. | 264/308 |
| 7,743,927 B2 * | 6/2010 | Svatek et al. | 209/656 |
| 8,474,597 B2 * | 7/2013 | Pier et al. | 198/396 |
| 8,485,336 B2 * | 7/2013 | Tenold et al. | 193/33 |
| 2004/0158415 A1 | 8/2004 | Lowes et al. | |
| 2005/0060955 A1 | 3/2005 | Porter et al. | |
| 2010/0072289 A1 | 3/2010 | Miyashiro | |
| 2010/0191369 A1 | 7/2010 | Kim | |

\* cited by examiner

APPARATUS FOR COUNTING DEPOSIT BEVERAGE CONTAINERS

RELATED APPLICATIONS

This patent application is a non-provisional of U.S. Patent Application No. 61/598,724 entitled "Apparatus For Counting Deposit Beverage Containers," filed Feb. 14, 2012.

FIELD

The field of the invention relates generally to container counting devices, and more specifically to apparatus for counting deposit beverage containers.

BACKGROUND

Certain types of beverage containers, such as bottles and cans, are made of recyclable materials such as aluminum, glass, or plastic. These containers can often be redeemed by consumers for money or other forms of compensation, wherein the redemption value is typically calculated on a per unit basis. Sometimes, the redemption value may be calculated by weight, but this method may result in inaccurate redemption values or require more work by consumers and redemption centers. For example, the presence of fluid in containers would increase the overall weight and redemption value of a collection of containers beyond their actual redemption value. In addition, the redemption value of different materials of equal weight may differ, and thus require consumers or redemption centers to take the extra step of sorting containers by material composition (e.g., glass, plastic, metal) before they are weighed.

Calculating the redemption value of containers on a per unit basis avoids these aforementioned issues but comes with its own set of issues. Manual counting of containers is time-consuming and labor-intensive. Furthermore, counting containers by hand, especially large quantities, is prone to errors.

SUMMARY OF THE INVENTION

An apparatus for counting deposit beverage containers that includes a loading basin for holding a plurality of deposit beverage containers, a feed chute for receiving the containers from the loading basin having an inlet end narrowing into at least one outlet end, and at least one feed channel extending from each outlet end. The feed channel includes a choke opening that orders the containers into a single file row, an upward bend following the choke opening that decreases the downward slope of the feed channel to moderate the flow of the containers, and a downward curve following the upward bend that accelerates each container to create separation between containers.

In one embodiment of the apparatus, the feed channel may include a bottom panel having a V-shaped contact surface, a low-friction contact surface, a liner insert, or a plurality of ribs extending upwards and aligned with the longitudinal axis of the feed channel.

In another embodiment of the apparatus, the radius of the downward curve is greater than about four inches.

In another embodiment of the apparatus, the loading basin of the apparatus may include a retaining member for guiding containers into the feed chute, an angled member for controlling the flow rate of containers into the feed chute, or transverse wheels for rotating a bin within the loading basin to control the flow rate of containers into the feed chute.

An apparatus for counting deposit beverage containers that includes a loading basin for holding a plurality of deposit beverage containers, a feed chute for receiving the containers from the loading basin having an inlet end narrowing into at least one outlet end, and at least one feed channel extending from each outlet end. The feed channel includes an upper portion having a choke opening that orders the containers into a single file row, a middle portion extending from the upper portion having an upward bend that decreases the downward slope of the feed channel to moderate the flow of the containers, and a downward curve following the middle portion that accelerates each container to create separation between containers, and a lower portion extending from the downward curve having an increased downward slope that further accelerates each container.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following detailed description and representative embodiments of the invention will best be understood with reference to the accompanying drawings, wherein the elements and features of the embodiments are designated by numerals throughout.

Illustrated in FIGS. 1-17 are several representative embodiments of an Apparatus for Counting Deposit Beverage Containers, which embodiments also include one or more methods of automatically counting deposit beverage containers. As described herein, the deposit container counting apparatus provides several significant advantages and benefits over devices and methods for counting deposit containers. However, the recited advantages are not meant to be limiting in any way, as one skilled in the art will appreciate that other advantages may also be realized upon practicing the present invention.

FIGS. 1-3a show an exemplary embodiment 10 of the deposit beverage container counting apparatus. The counting apparatus 10 includes a loading basin 20 for holding a plurality of deposit beverage containers to be counted by the counting apparatus, a feed chute 40 for merging the plurality of deposit containers received from the loading basin 20 into one or more rows 2 of deposit containers 4, and one or more feed channels 50 for receiving a row 2 of deposit containers 4 and conveying the deposit containers to a sensor assembly 84 which is used to sense the presence of a deposit container 4 in the feed channel 50 and to supply a signal to an electronic counting device in a control panel 35 which update the count and provides an updated signal to one or more output displays 39.

Figure 16:
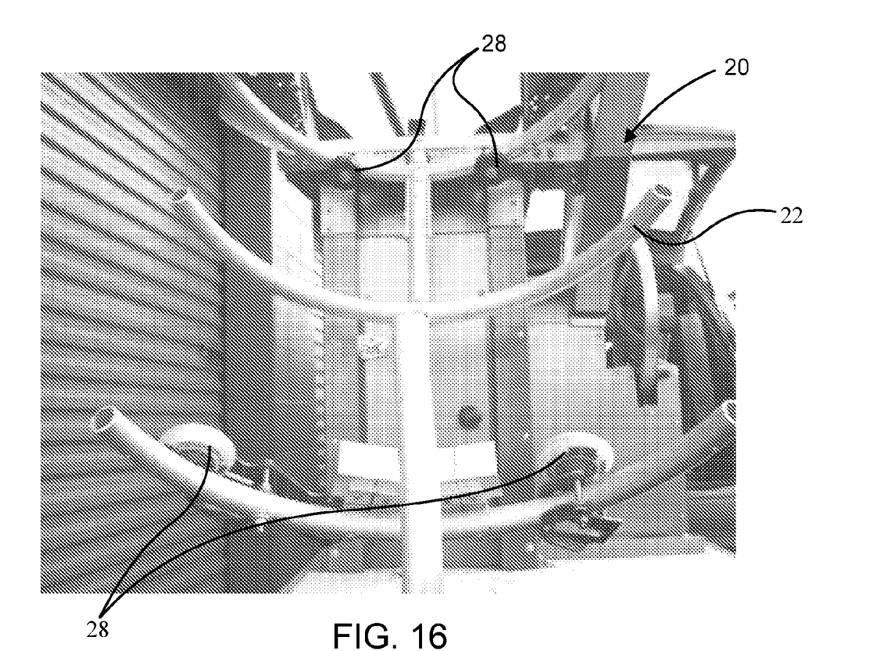
FIG. 16 is a back view of the load cradle located on the counting apparatus of FIG. 1.

In the embodiment shown, the loading basin 20 includes a cradle 22 which supports and lifts a removable bin 26 holding the deposit containers 4 to a position above the feed chute 40 and feed channel(s) 50, so that the deposit containers 4 fall out of the removable bin 26 and slide down the feed channel(s) 50 under the force of gravity. In some aspects the removable bin 26 can include the standard 32-gallon plastic barrels commonly used at redemption centers. The cradle 22 has wheels mounted transverse to the longitudinal centerline of the cradle, as shown in FIG. 16. These wheels allow easier and smooth rotation of the removable bin 26 within the cradle 22. The loading basin 20 also includes a retaining member 24 which fits into the opening of the removable bin 26 to prevent containers from falling out of the bin as the bin is raised, and to guide the deposit containers 4 into the feed chute 40 once the cradle 22 has been rotated to the upward position, as shown in FIGS. 2 and 3.

Figure 3:
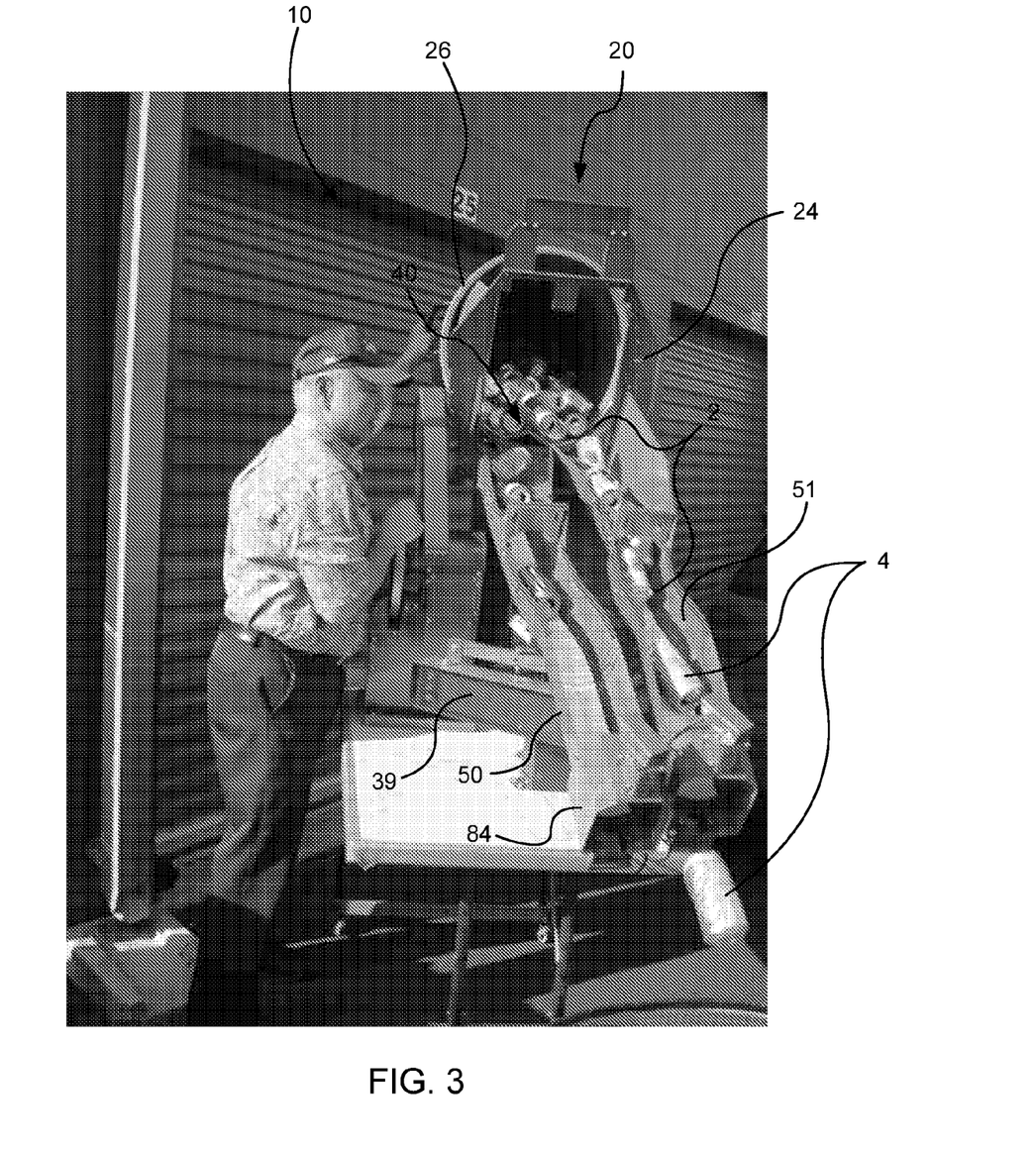
FIG. 3 is a perspective front view of the counting apparatus of FIG. 1 in operation.
Figure 3A:
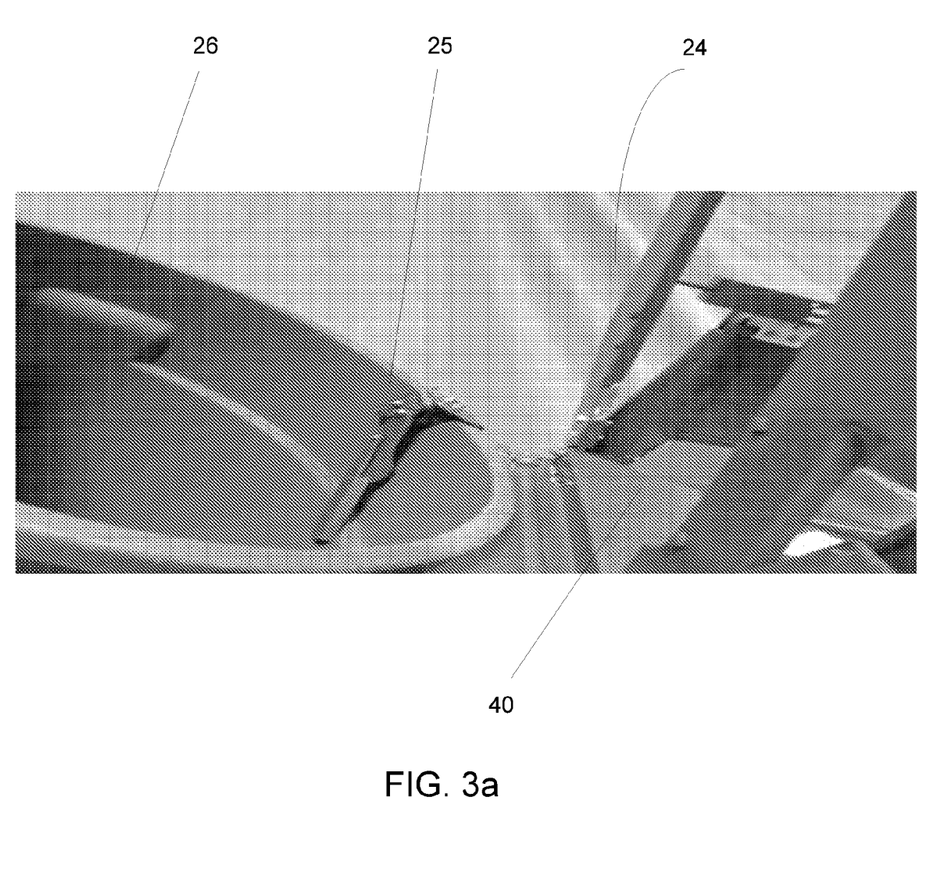
FIG. 3a is a close-up perspective side view of a loading basin of the counting apparatus of FIG. 1.

The loading basin 20 also includes an angled member 25, as shown in FIG. 3a, that is attached to the cradle and extends into the removable bin 26, and is oriented at an angle such that it obstructs the movement of containers moving with the rotating bin and forces these containers towards the top of the bin. Thus, the angled member 25 helps produce is a more evenly distributed flow of containers from the removable bin 26, reduces the likelihood of logjams in the feed chute 40, and results in higher average container flow rates. It is to be appreciated, however, that other configurations for the loading basin 20 are also possible, and that any mechanism for conveying a plurality of deposit containers to the feed chute 40, whether attached to the feed chute or separate, is considered to fall within the scope of the present invention.

Figure 1:
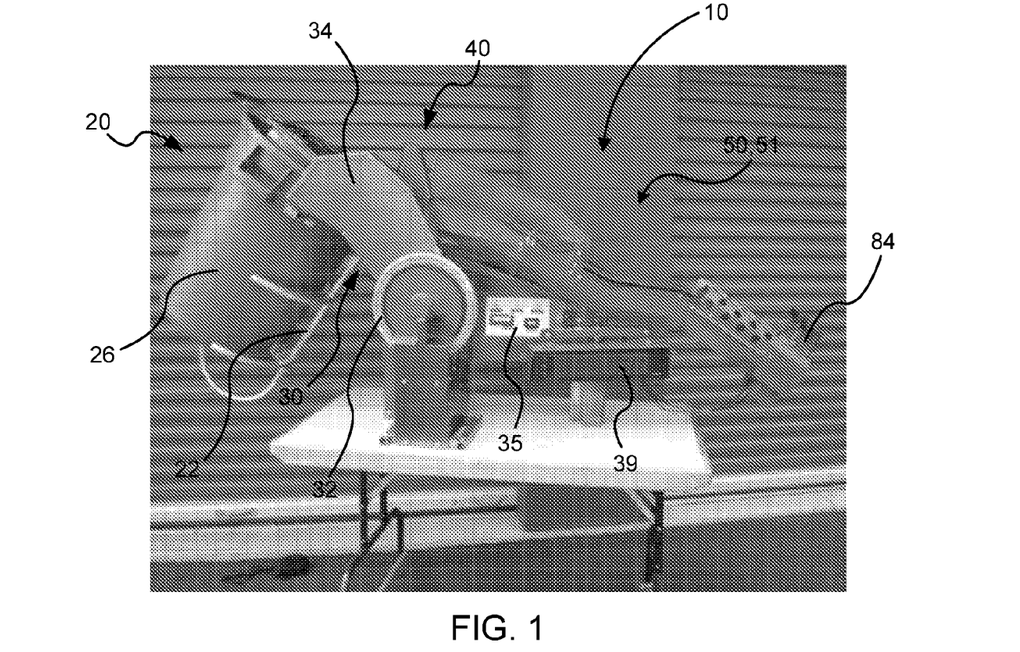
FIG. 1 is a side view of an apparatus for counting deposit beverage containers, in accordance with an embodiment of the present invention.
Figure 2:
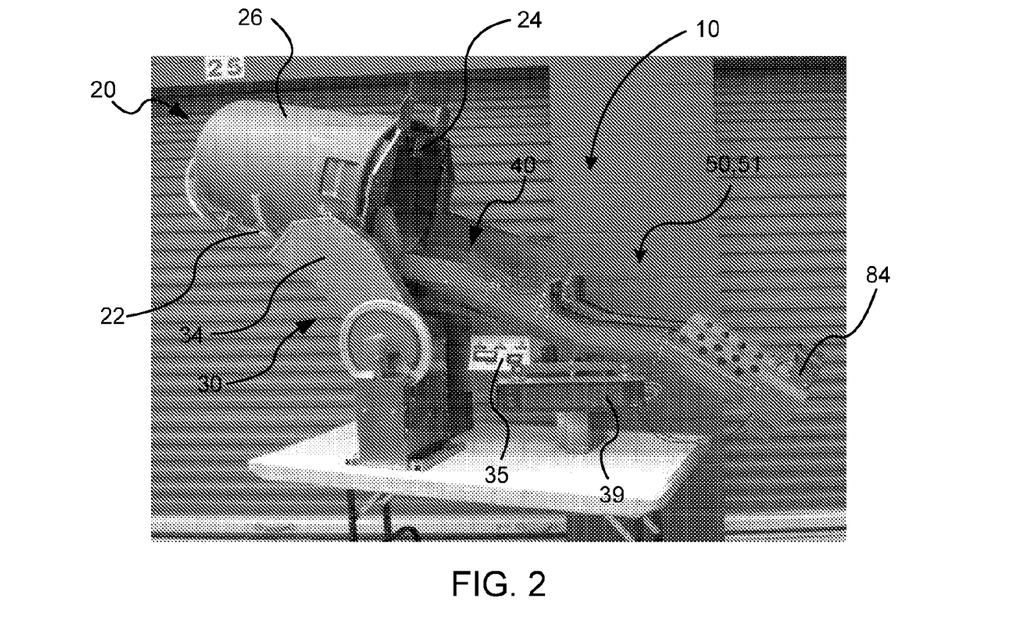
FIG. 2 is a perspective side view of the counting apparatus of FIG. 1 with a raised loading basin.

A lift mechanism 30 can be used to rotate the cradle 22 to lift the removable bin 26 from its lowered loading position (FIG. 1) to its upward dumping position (FIGS. 2 and 3). In the embodiment shown, the lift mechanism 30 includes a hand wheel 32 which operates a transmission assembly located within the lift housing 34, such as a pulley, lever arm or gear, and which transmission assembly provides sufficient leverage force for rotating the cradle 22 and removable bin 26. The lift housing 34, furthermore, also contains a locking device which locks the cradle 22 into the upper position so that it does not accidently rotate down to the lowered position during operation of the counting apparatus (FIG. 3), as well as a braking device which gradually lowers the cradle 22 and removable bin 26 to the lowered position upon release of the locking device. As may be appreciated by one of skill in the art, the locking device and braking device can be combined into a single mechanism which performs both functions.

Also shown in FIGS. 1-3 is a control panel 35, which includes the electronic counting device that receives the electronic signals from the one or more sensor assemblies 84, updates the count of deposit containers 4 which have exited the counting apparatus 10, and outputs the updated count to one or more displays, such as the large display 39 having a size and orientation that is easily observable by a customer who's deposit cans are being counted.

Figure 4:
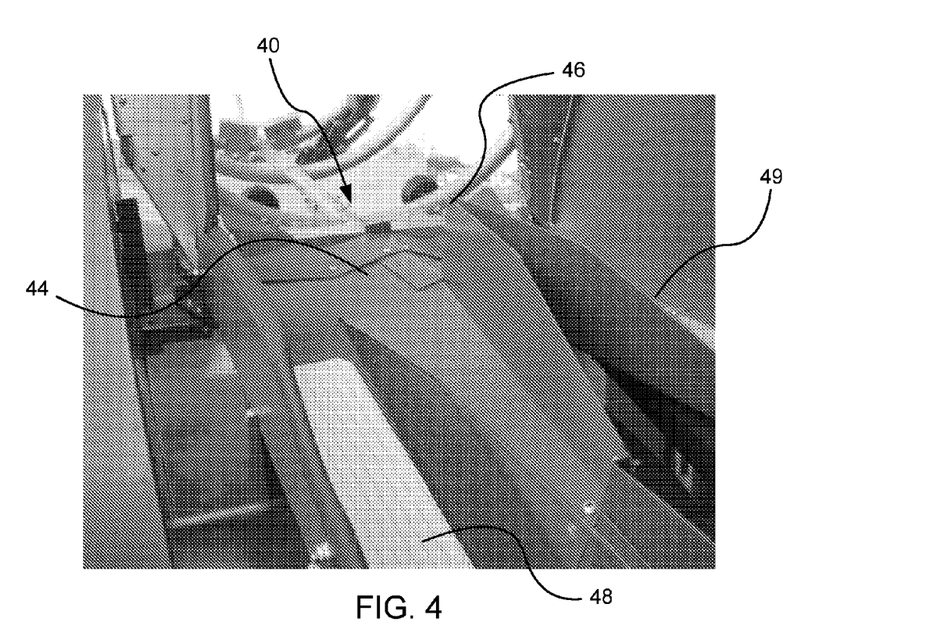
FIG. 4 is a close-up perspective from view of a feed chute of the counting apparatus of FIG. 1.
Figure 5:
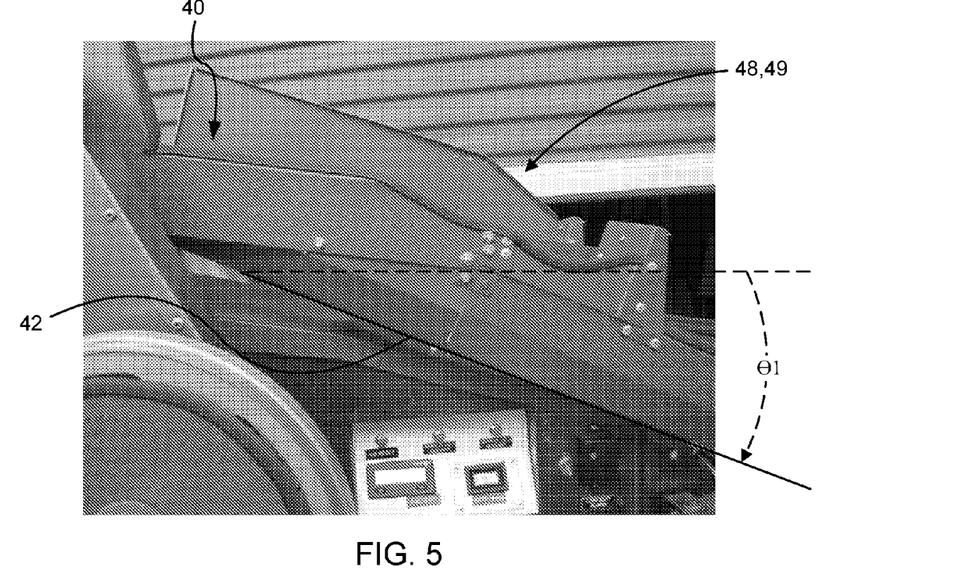
FIG. 5 is a close-up side view of the feed chute of FIG. 4.

The feed chute 40 is shown with more detail in FIGS. 4-5. The feed chute 40 includes an inlet end 44 and one or more outlet openings 48, 49 and is downwardly inclined from the inlet to the outlet opening(s) at a first slope 42 at a first slope angle $\ominus 1$. The magnitude of the first slope angle $\ominus 1$ determines how fast the containers clear out of the feed chute and move down the feed channels. In the representative embodiment shown in FIG. 5, the first slope angle $\ominus 1$ can range from about fifteen degrees to about thirty degrees below horizontal, and is preferably between about twenty-five degrees to about twenty-eight degrees below horizontal. This high degree of inclination of the first slope 42 can operate to increase the break-away acceleration of the deposit containers away from the feed chute 40 as they enter the feed channels, which can both improve the deposit container through-put rate and minimize the incidence of jams at the choke plate, as described below.

As can be seen, the feed chute also narrows from the inlet end to the outlet opening(s) so that the plurality of deposit containers being dumped into the inlet end 44 from the loading basin are merged into one or more rows of deposit containers by the time they exit through the outlet openings 48,49 (see FIG. 3). If the counting apparatus includes multiple feed channels 50,51 such as the dual feed-channel embodiment shown in FIGS. 1-17, the feed chute 40 also includes a divider 46 which splits the flow of deposit containers into the two rows.

Figure 6:
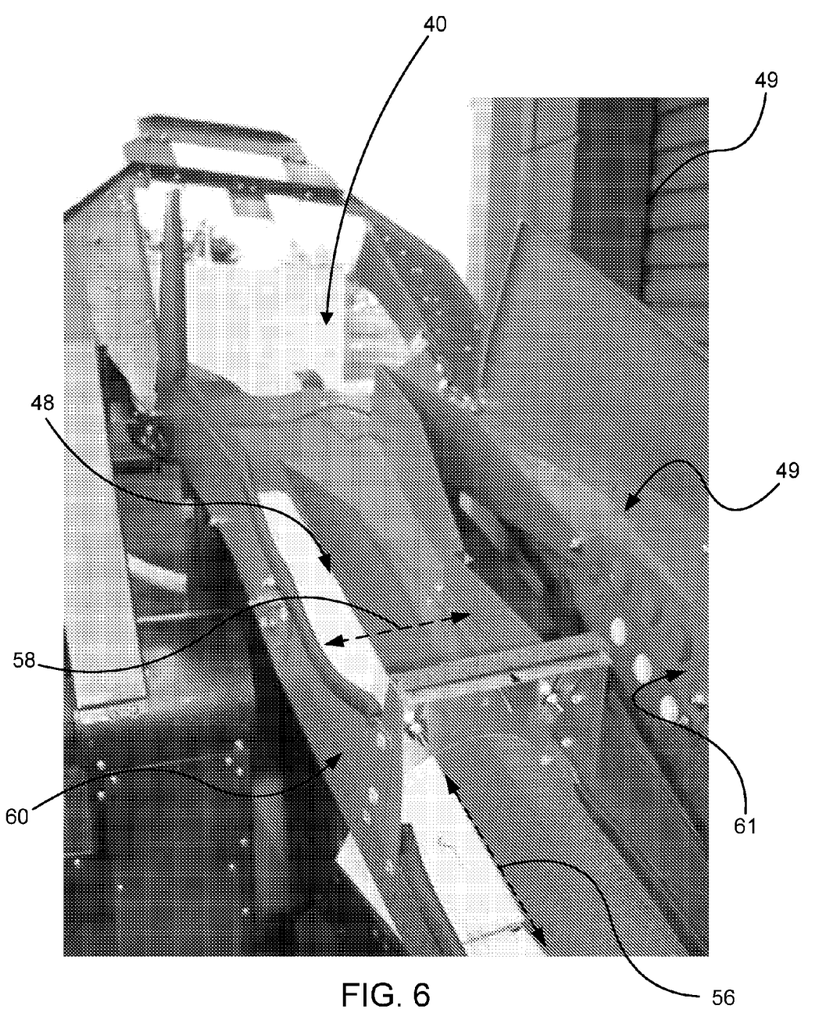
FIG. 6 is an expanded perspective front view of the feed chute and feed channels of the counting apparatus of FIG. 1.
Figure 7:
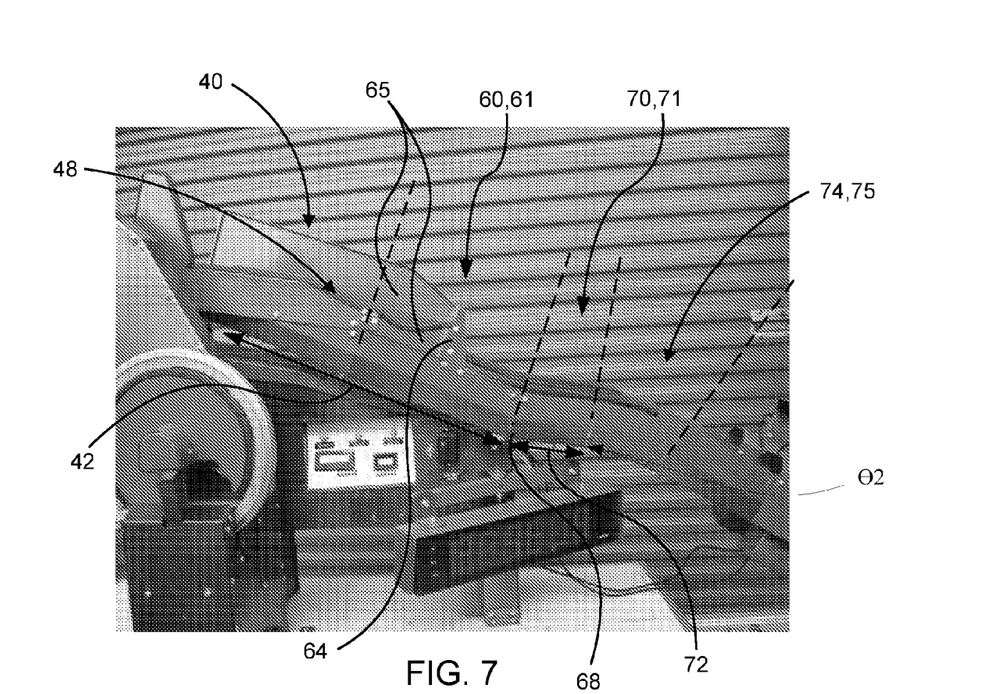
FIG. 7 is side view of the feed chute and feed channels of the counting apparatus of FIG. 1.
Figure 8:
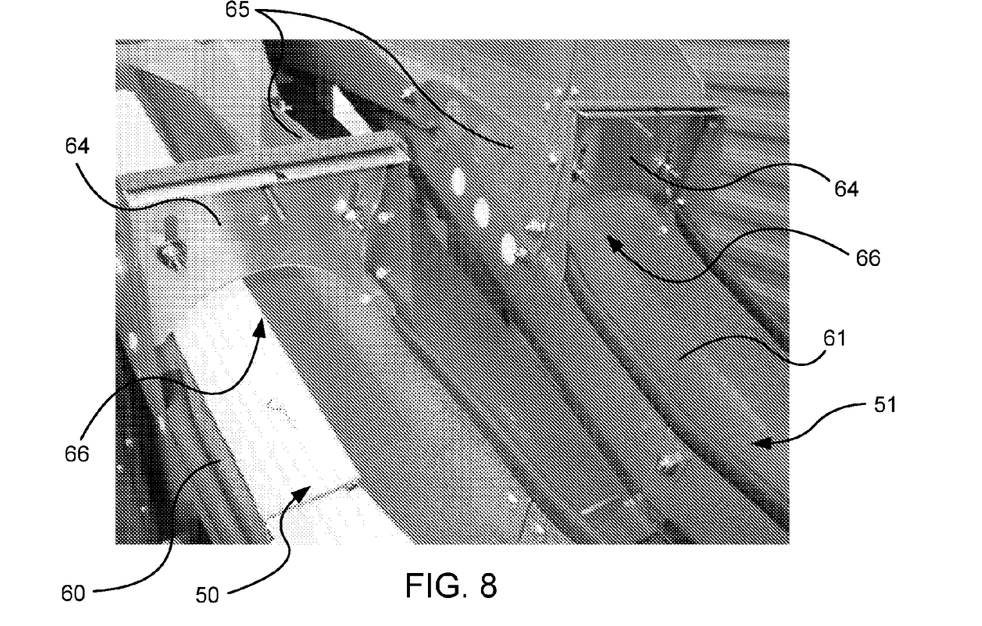
FIG. 8 is a close-up perspective view of the upper channel portion and choke plates of the feed channels of FIG. 7.

Referring now to FIGS. 6-8, the one or more outlet opening(s) 48,49 of the feed chute 40 can extend seamlessly into the upper channel portions 60,61 of the feed channels 50,51 at the point where the feed chute 40 narrows to the width 58 of the feed channels (FIG. 6). Furthermore, the upper channel portions 60,61 of the feed channels can also maintain the same downward slope 42 of the feed chute 40 until a first bend 68 in the feed channel is reached at the boundary between the upper channel portions 60,61 and middle channel portions 70,71 of the feed channels (FIG. 7). Extending the same downwardly angled slope 42 of the feed chute 40 through the upper channel portion 60 of the feed channel 50 operates to maintain the forward and downward movement of the deposit containers as they exit the feed chute and travel towards the choke opening 66. The choke opening 66 can be formed by the choke plate 64 which extends over the top of the upper channel portion 60 of the feed channel 50 (FIG. 8).

Because the deposit containers leaving the outlet opening 48,49 of the feed chute 40 can sometimes be angled sideways, bunched together or stacked on top of each other, the choke opening 66 operates to restrict and order the row of the deposit containers into a single file, one-at-a-time row of deposit containers having the long axis of each deposit container aligned with the longitudinal axis 56 of the feed channel 50,51. Moreover, as the misaligned deposit containers can tend to pile up against choke plate 64 and clog the feed channel 50,51 during counting operations, manual clearing of the clog may be required by the operator. Manual clearing of the clogs can be accomplished easily and safely as the counting apparatus operates entirely under the influence of gravity and there are no moving machinery or powered parts. Additional side plates 65 can be attached to the sidewalls of the feed channels 50,51 upstream of the choke opening 66 to extend the height of the sidewalls and prevent the deposit containers from spilling over the sides of the feed channels when a clog does occur.

Referring back to FIG. 7, the upper channel portions 60,61 of the feed channels 50,51 can end at the first bend 68, which can be an upward bend that decreases the downward angle of the middle channel portions 70,71 to a second downward slope 72 at a second slope angle $\ominus 2$ that is less inclined than the first downward slope 42 of the feed chute 40 and upper channel portions 60,61 of the feed channels. The upward bend 68 can be a short-radius bend or a long-radius bend. In the representative embodiment shown in FIG. 7, the second slope angle $\ominus 2$ can range from about zero degrees to about fifteen degrees below horizontal, and is preferably between about zero degrees to about five degrees below horizontal.

The reduced steepness of the second downward slope 72 serves to slow down and stabilize the flow of deposit containers and to keep them from becoming airborne at the transition channel portion 74,75 described below. In addition, when there are a large number of deposit containers traveling down the feed channel at the same time, the reduction in slope at the middle channel portions 70,71 can cause the deposit containers to contact each other end-to-end, thereby slowing any faster-traveling deposit containers down to the speed of the other deposit containers.

Thus, as the row of deposit containers approaches the final portion of the feed channel, namely the transition channel portions 74,75 and the lower channel portions 80,81, the deposit containers will have been merged into a one or more rows of deposit containers in the feed chute 40, ordered into single file and aligned in with the longitudinal axis of the feed channels 50,51 at the choke openings 66 of the upper channel portion 60,61, and then slowed in the middle channel portions 70,71 to ensure that the deposit containers do not enter the transition channel portions 74,75 with too great a velocity. When there is a large group of deposit containers traveling through the feed channel at the same time, moreover, the deposit containers are abutted end-to-end in the middle channel portions 70,71 so that each container approaches the transition channel portions 74,75 at approximately the same speed.

Figure 9:
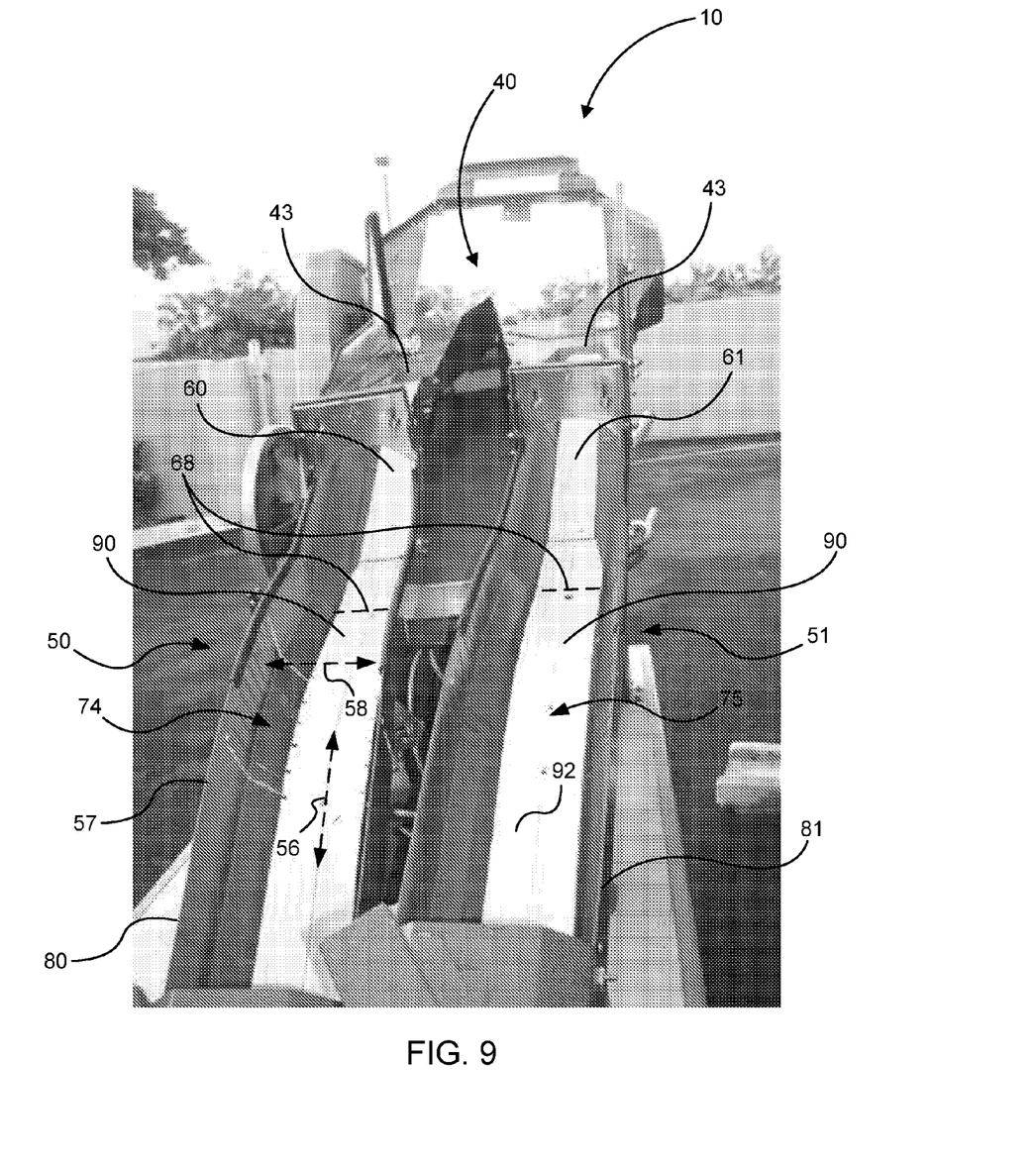
FIG. 9 is a perspective front view of the feed chute and feed channels of the counting apparatus of FIG. 1.

FIG. 9 is a perspective front view of the feed chute 40 and feed channels 50,51 of the counting apparatus 10, and illustrates the placement of a liner 90 over the bottom panels 52 of the feed channels from the start of the feed channel slots 43 formed into the bottom of the feed chute 40, through the choke opening and middle channel portions 60,61, and clear through to the transition channels 74,75 and the ends of the lower channel portions 80,81. The liner 90 can be a removable and/or replaceable insert, and can include a low-friction contact surface 92 for slidably supporting the depositing containers as they slide down the feed channels 50,51. The entire liner 90 can be made from a low-friction type material, such as low-friction plastic, or it can be coated with a slick surface treatment such as wax or a low-friction polymer, etc. In addition, the liner 90 can be configured to provide a smooth, uninterrupted surface while transitioning both the upwardly-curved short-radius bend 68 and at downwardly-curved the long-radius transition channels 74,75.

Also shown in FIG. 9, the feed channels 50,51 can have a width 58 which varies along the length of the feed channels. For instance, the feed channels may widen downstream of the choke opening 66 so as to reduce the possibility of inadvertent contact between the deposit containers and the sidewalls 57 which may knock the deposit containers out of alignment with the longitudinal axes 56 of the feed channels 50,51.

Figure 10:
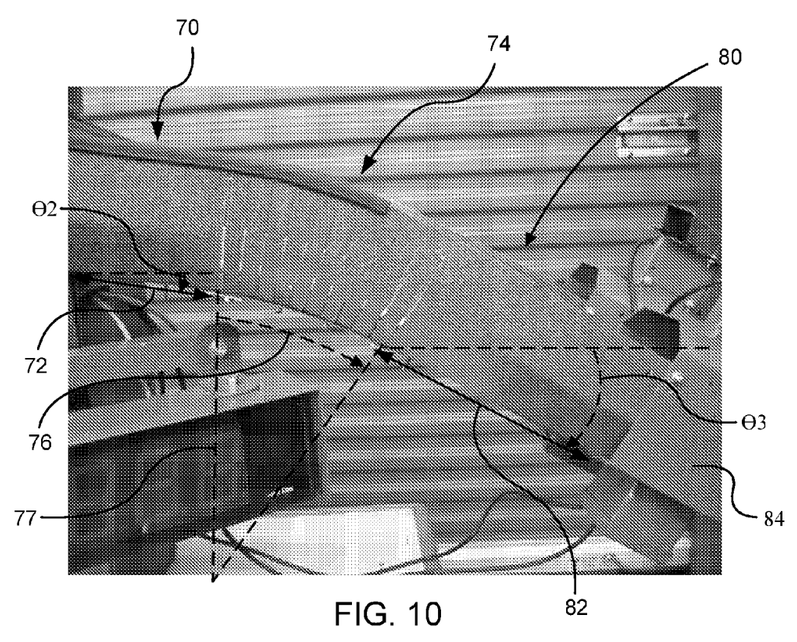
FIG. 10 is a close-up side view of the middle channel portion, the transition channel portion, and the lower channel portion of the feed channel of FIG. 8.

Referring now to FIG. 10, the transition channel portion 74 of feed channel 50 is configured to provide a downward, long-radius transition curve 76 between the middle channel portion 70 and the lower channel portion 80. The transition curve 76 can have a radius 77 that is equal to or greater than the width 58 of the feed channel 50 at the transition channel portion 74 (see FIG. 9), up to about five times or greater than the width 58 of the feed channel 50 at the transition channel portion. Therefore, because the width 58 of the feed channel 50 at the transition channel portion 74 is about four inches, the radius 77 of the long-radius transition curve can thus range from at least about four inches to about twenty inches. In the embodiment of the counting apparatus shown in FIG. 10, the radius 77 of the transition curve 76 is about eighteen inches.

As can be seen in FIG. 10, the lower channel portion 80 is positioned at a third downward slope 82 at a third slope angle $\ominus 3$ that is more inclined than the second downward slope 72 of the middle channel portion 70. Furthermore, the third slope angle $\ominus 3$ can be substantially the same as, less than, or greater than the first slope angle $\ominus 1$ of the upper channel portion 60, and can range from about fifteen degrees to about thirty degrees below horizontal. In a preferred embodiment, moreover, the third slope angle $\ominus 3$ can range between about twenty-five degrees to about twenty-eight degrees below horizontal.

It is thought that each deposit container is accelerated by the force of gravity as it passes over the downward, long-radius transition curve 76, which acceleration in turn causes the deposit container to separate from the adjacent deposit container which is immediately behind (e.g. above) the deposit container (e.g. lower) undergoing the acceleration. As the lower deposit container continues to move down the steeper slope 82 of the lower channel portion 80 the separation between the two objects will continue to grow, even though the upper deposit container by this time is also passing over the transition curve 76. Consequently, this separation or "singulation" created by the long-radius transition curve 76 can allow for the lower container to pass through the sensor assembly 84 having a sufficient separation from the next adjacent deposit container to ensure accurate counts.

The long-radius transition curve 76 provides the added benefit of controlling the alignment and/or orientation of the deposit container as it passes through the transition channel portion 74 of the feed channel 50, causing the flow of deposit containers to be smoother and more in-line with longitudinal axis of the feed channels. Because the downward change in direction is gradual rather than abrupt, the deposit containers will not become airborne and instead will remain in continuous contact with contact surface of the feed channel's bottom panel or liner insert. This continuous contact can ensure that the long axis of the deposit container remains aligned with the longitudinal axis of the feed channel as the deposit container rounds the transition curve 76 and proceeds down the lower channel portion 80 to reach the sensor assembly 84 located at the far end of the lower channel portion 80.

If not for the continuous contact with the contact surface providing guidance, the deposit container could become airborne after passing over the downward bend and skew out-of-alignment, which on occasion could allow one or both ends of the deposit container to contact a side wall of the feed channel and thereby slow the passage of the lower deposit container enough for the following deposit container to catch up. In this event the two deposit containers could enter the sensor assembly without adequate separation, which may cause the counting apparatus to miscount the two separate deposit containers as a single deposit container.

Figure 11:
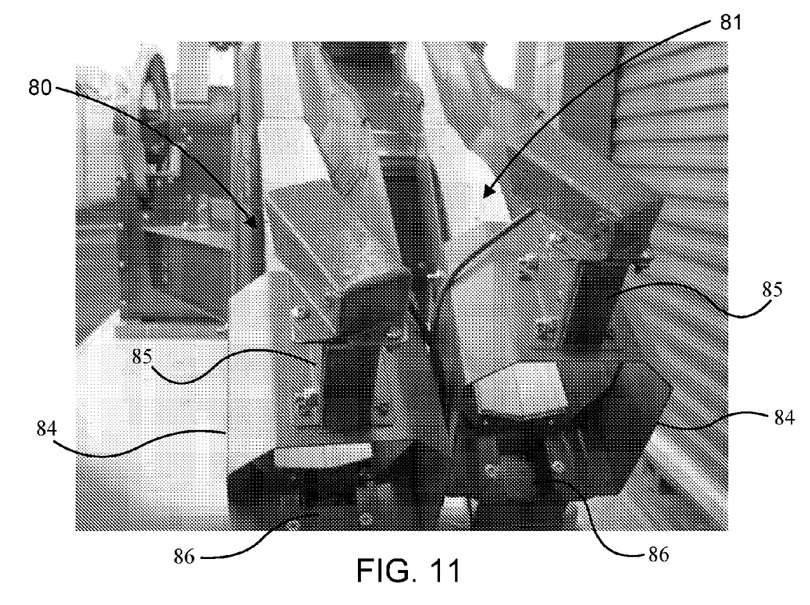
FIG. 11 is close-up front view of the lower channel portion and sensor assembly of the counting apparatus of FIG. 1.

The sensor assembly 84 of the lower channel portion 80 is shown in more detail in FIG. 11. In one embodiment the sensor assembly 84 can include an optical sensor 85 having a light-generating functionality that directs a beam of light across the exit opening of the sensor assembly to strike a reflector 86, which in turn reflects the beam of light back to a light-detector functionality when there is no intervening object to interrupt the light beam's passage. The beam of light can be in electromagnetic wavelengths that are either visible or invisible (e.g. infrared, ultraviolet, etc.) to the human eye. The sensor 85 further supplies an electric signal to an electronic counting device (not shown) each time it senses the reflected beam of light. The electronic counting device then updates the count of objects which have interrupted the beam.

As can be seen in the figure, the orientation of the sensor 85/reflector 87 can be in the vertical plane so as to sense and count any deposit container which passes down the center portion of the feed channel, regardless of its height. Furthermore, and as would be appreciated by one of skill in the art, other types of sensor configurations for sensing the passage of deposit bottles are also possible and may be considered to fall within the spirit and scope of the present invention.

Figure 12:
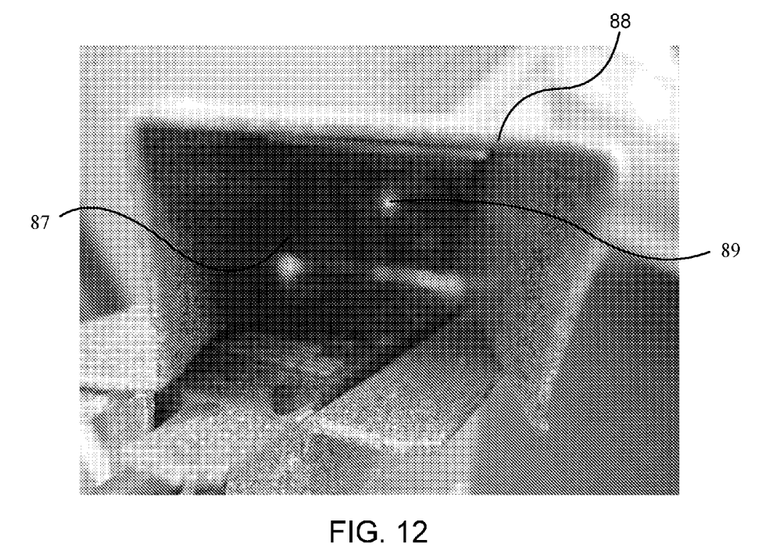
FIG. 12 is a close-up view of a sensor indicator mirror located on the counting apparatus of FIG. 1.

The sensor assembly can also include a visible indication to the user or operator of the counting apparatus as to whether or not the beam of light is currently unobstructed or obstructed, as a check to ensure that the optical sensing components are working correctly. Because of the sensor's vertical installation in the sensor assembly, this indicator light may not be easy to see from the operator's position. Illustrated in FIG. 12 is a housing cover 88 which holds and protects a mirror 87 that reflects an image of the sensor's instantaneous indicator light 89 to the user.

Figure 13:
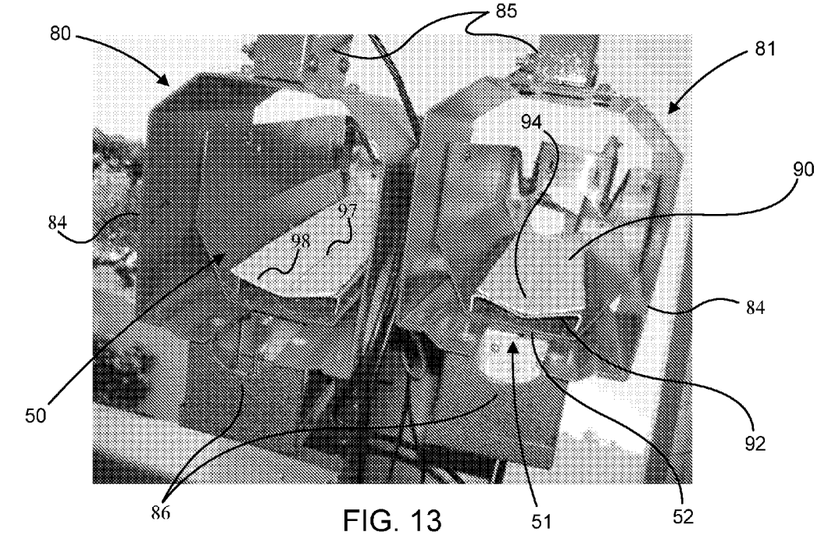
FIG. 13 is an end view of the lower channel portion and sensor assembly of the counting apparatus of FIG. 1.

FIG. 13 is an end view of the lower channel portions 80, 81 and sensor assemblies 84 of the feed channels of the counting apparatus. In addition to the close-up view of the sensor assemblies 84, including the sensors 85 and reflectors 86, FIG. 13 also provides a clear illustration of the liner insert 90 and liner mount 92 which attaches the liner insert 90 to the bottom panels 52 of the feed channels 50, 51.

Figure 14:
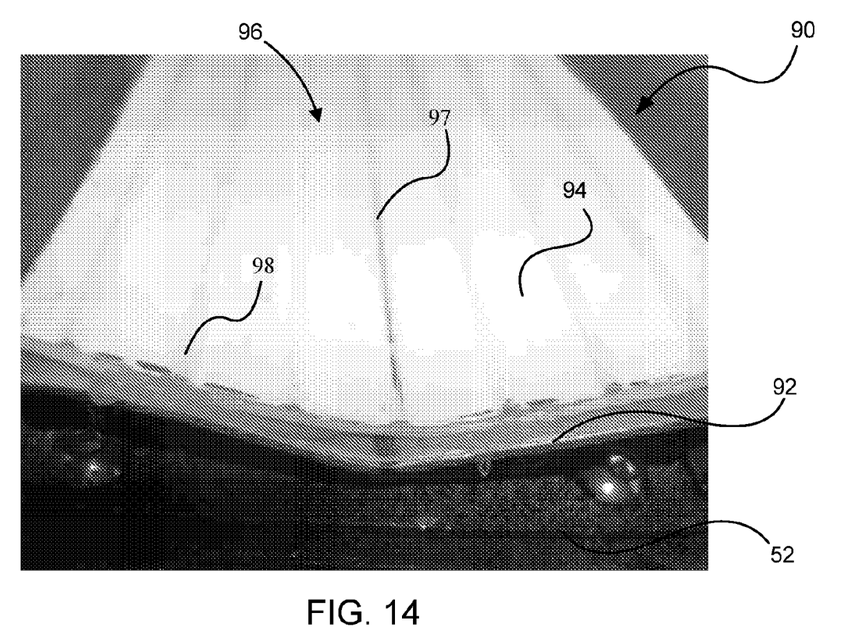
FIG. 14 is a close-up view of a liner insert located on the counting apparatus of FIG. 1.

A close-up view of the liner 90 is provided in FIG. 14. As can be seen, the liner insert 90 can include a V-shaped profile 96 having a center groove 97 that is aligned with the longitudinal axis of the feed channel. This V-shaped profile 96 can be used to guide the long axes of the generally-cylindrical deposit containers into alignment with the longitudinal axis of the feed channel and to maintain that alignment from the choke opening to the sensor assembly.

Also visible in FIGS. 13-14 are a plurality of ribs 98 extending upward from the contact surface 94 of the insert 90 that run parallel with the longitudinal axis of the feed channel 50. The ribs 98 can function to lift the deposit containers off most of the surface area of the contact surface 94 and thereby reduce the total friction-generating contact area between the deposit containers and the liner 90 to a fraction of what it would be otherwise. This allows the deposit containers to travel easily and quickly down the length of the counting apparatus. The ribs 98 also reduce the negative impact of sticky or syrupy residues that are often present on the deposit containers before being loaded into the loading basin for counting, both by facilitating the movement of the deposit containers down the feed channels to the sensor assembly and by limiting the amount of residue transferred to the contact surfaces which could slow subsequent deposit containers moving through the feed channels.

Figure 15:
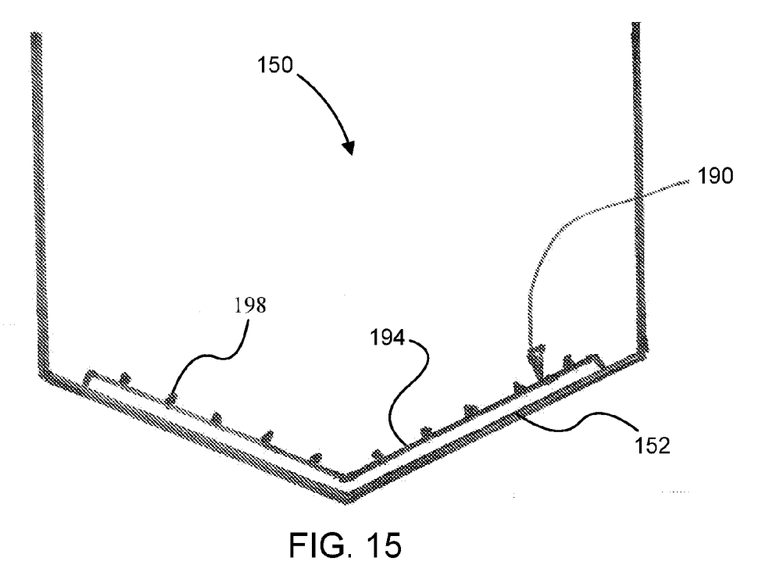
FIG. 15 is a schematic view of a liner insert, in accordance with another embodiment of the present invention.

In the embodiment of the counting apparatus 10 illustrated in FIGS. 13 and 14, a liner mount 92 is used to attach the V-shaped liner 90 to the flat, bottom panel 52 of the feed channel 50. As shown in FIG. 15, however, the liner mount may not be required in other embodiments because the V-shaped liner 190 may be directly attached to the bottom panel 152 of the feed channel 150 which is also V-shaped. As with the embodiment illustrated above, the liner 190 can include both a slick contact surface 194 and ribs 198 running parallel with the longitudinal axis of the feed channel 150. The liner 190 can be attached to the bottom panel 152 with fasteners and the like so as to be removable when necessary, but may also be attached with glue or a similar adhesive to form a more-permanent assembly.

With regard to other features of the counting apparatus, 10, FIG. 16 illustrates the cradle 22 of the loading basin 20 having one or more sets of transverse roller wheels 28 attached to the cradle cross members. These roller wheels 28 can both center the removable bin (see FIGS. 1-3) within the cradle and allow the operator to more easily rotate the removable bin. This rotation, working in conjunction with the angled member 25 shown in FIG. 3a, provides for a smoother and more continuous flow of containers out of the removable bin 26, and allows the operator to control the feed rate of containers from the removable bin 26 into the feed chute 40, as described earlier. The wheels also reduce the wear and tear on the loading bins and the cradle hinges.

Figure 17:
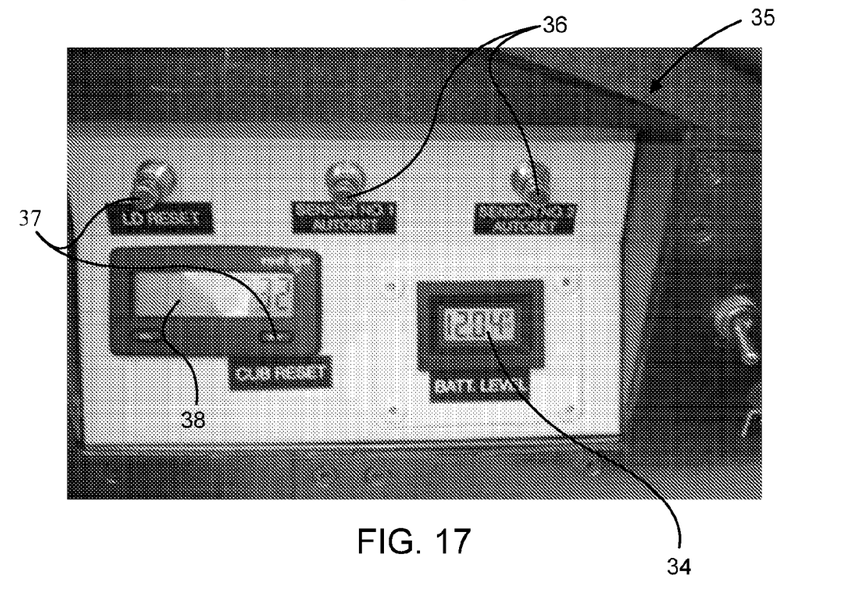
FIG. 17 is a close-up view of the control panel of the counting apparatus of FIG. 1.

The control panel 35 is shown in FIG. 17, and includes a variety of control switches and displays needed to operate the counting apparatus. For instance, the sensor resets 36 can reset one or more electronic counting devices (not shown) which count the impulse signals from the sensor assemblies, and the display resets 37 can reset the deposit container count on the both the small operator display 38 and the large customer display, 39 in FIGS. 1-3. A battery level indicator 34 can also be provided to show the charge status of the battery which powers the optical sensors, the electronic counting device and the two displays.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for counting deposit beverage containers, the apparatus comprising:
   a loading basin for holding a plurality of deposit beverage containers comprising
      a cradle to support and lift a removable bin; and
      a retaining member that fits over an opening of the removable bin;
   a feed chute for receiving said containers from said loading basin, said feed chute having an inlet end narrowing to at least one outlet end, wherein the retaining member guides containers into the feed chute; and
   at least one feed channel extending from each outlet end, said feed channel comprising:
      a choke opening that orders said containers into a single file row;
      an upward bend following said choke opening that decreases the downward slope of said feed channel to moderate the flow of said containers; and
      a downward curve following said upward bend that accelerates each container to create separation between containers.

2. The apparatus of claim 1, wherein said feed channel includes a bottom panel having a V-shaped contact surface.

3. The apparatus of claim 1, wherein said feed channel includes a bottom panel having a low-friction contact surface.

4. The apparatus of claim 1, wherein said feed channel includes a bottom panel having a liner insert.

5. The apparatus of claim 1, wherein said feed channel includes a bottom panel having a plurality of ribs extending upward therefrom, said ribs being aligned with the longitudinal axis of said feed channel.

6. The apparatus of claim 1, wherein said feed chute includes two or more outlet ends, wherein a feed channel extends from each outlet end.

7. The apparatus of claim 1, wherein the radius of said downward curve is greater than about four inches.

8. The apparatus of claim 1, wherein said loading basin includes an angled member for controlling the flow rate of containers into said feed chute.

9. The apparatus of claim 1, wherein said loading basin includes transverse wheels for rotating a bin within said loading basin to control the flow rate of containers into said feed chute.

10. An apparatus for counting deposit beverage containers, the apparatus comprising:
    a loading basin for holding a plurality of deposit beverage containers comprising
       a cradle to support and lift a removable bin; and
       a retaining member that fits over an opening of the removable bin;
    a feed chute for receiving said containers from said loading basin, said feed chute having an inlet end narrowing to at least one outlet end, wherein the retaining member guides containers into the feed chute; and
    at least one feed channel extending from each outlet end, said feed channel comprising:
       an upper portion having a choke opening that orders said containers into a single file row;
       a middle portion extending from said upper portion having an upward bend that decreases the downward slope of said feed channel to moderate the flow of said containers;
       a downward curve following said middle portion that accelerates each container to create separation between containers; and
       a lower portion extending from said downward curve having an increased downward slope that further accelerates each container.

11. The apparatus of claim 10, wherein said feed channel includes a bottom panel having a V-shaped contact surface.

12. The apparatus of claim 10, wherein said feed channel includes a bottom panel having a low-friction contact surface.

13. The apparatus of claim 10, wherein said feed channel includes a bottom panel having a liner insert.

14. The apparatus of claim 10, wherein said feed channel includes a bottom panel having a plurality of ribs extending upward therefrom, said ribs being aligned with the longitudinal axis of said feed channel.

15. The apparatus of claim 10, wherein said feed chute includes two or more outlet ends, wherein a feed channel extends from each outlet end.

16. The apparatus of claim 10, wherein the radius of said downward curve is greater than about four inches.

17. The apparatus of claim 10, wherein said loading basin includes an angled member for controlling the flow rate of containers into said feed chute.

18. The apparatus of claim 10, wherein said loading basin includes transverse wheels for rotating a removable bin within said loading basin to control the flow rate of containers into said feed chute.

* * * * *